United States Patent [19]
Potter

[11] Patent Number: 5,984,659
[45] Date of Patent: Nov. 16, 1999

[54] TUBE HANDLING APPARATUS

[75] Inventor: Terry C. Potter, Lambertville, Mich.

[73] Assignee: Technology Concepts Products, Inc., Toledo, Ohio

[21] Appl. No.: 09/031,395

[22] Filed: Feb. 26, 1998

[51] Int. Cl.$^6$ ................................................. B29C 53/08
[52] U.S. Cl. ........................... 425/392; 425/393; 425/438
[58] Field of Search ................................... 425/392, 393, 425/438

[56] References Cited

U.S. PATENT DOCUMENTS

| | | | |
|---|---|---|---|
| 3,493,998 | 2/1970 | Mueller | 425/393 |
| 3,591,896 | 7/1971 | Tartaglia | 425/393 |
| 3,797,981 | 3/1974 | Van Dijk | 425/392 |
| 3,890,079 | 6/1975 | Slater | 425/393 |
| 4,929,167 | 5/1990 | Pepper | 425/392 |
| 5,525,049 | 6/1996 | Paletta | 425/392 |
| 5,817,270 | 10/1998 | Prenger et al. | 425/392 |

FOREIGN PATENT DOCUMENTS 1031744   7/1983   U.S.S.R. ................................. 425/392

*Primary Examiner*—Harold Pyon
*Assistant Examiner*—Mark A. Wentink
*Attorney, Agent, or Firm*—Emch, Schaffer, Schaub & Porcello Co., L.P.A.

[57] ABSTRACT

A tube handling machine for loading and unloading tube workpieces, such as hoses, from mandrels is disclosed. The machine includes a mandrel support which mounts a plurality of mandrels. First and second pluralities of driven rollers have outer surfaces for engaging the tube workpieces for urging them along the mandrels. A pivotal magazine holds a supply of tubular workpieces and directs them to the rollers. In a preferred embodiment, a mandrel support includes a gripper for engaging a predetermined mandrel support and moving it toward a position where the mandrels are between the first and second pluralities of driven rollers.

14 Claims, 6 Drawing Sheets

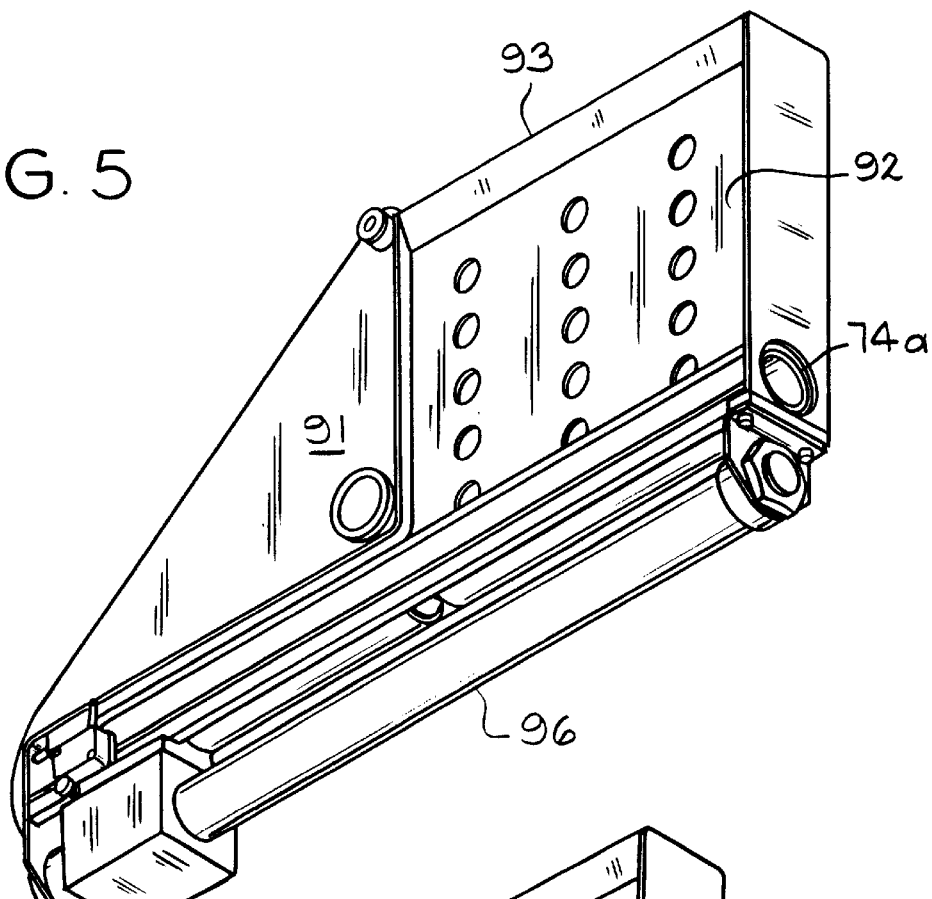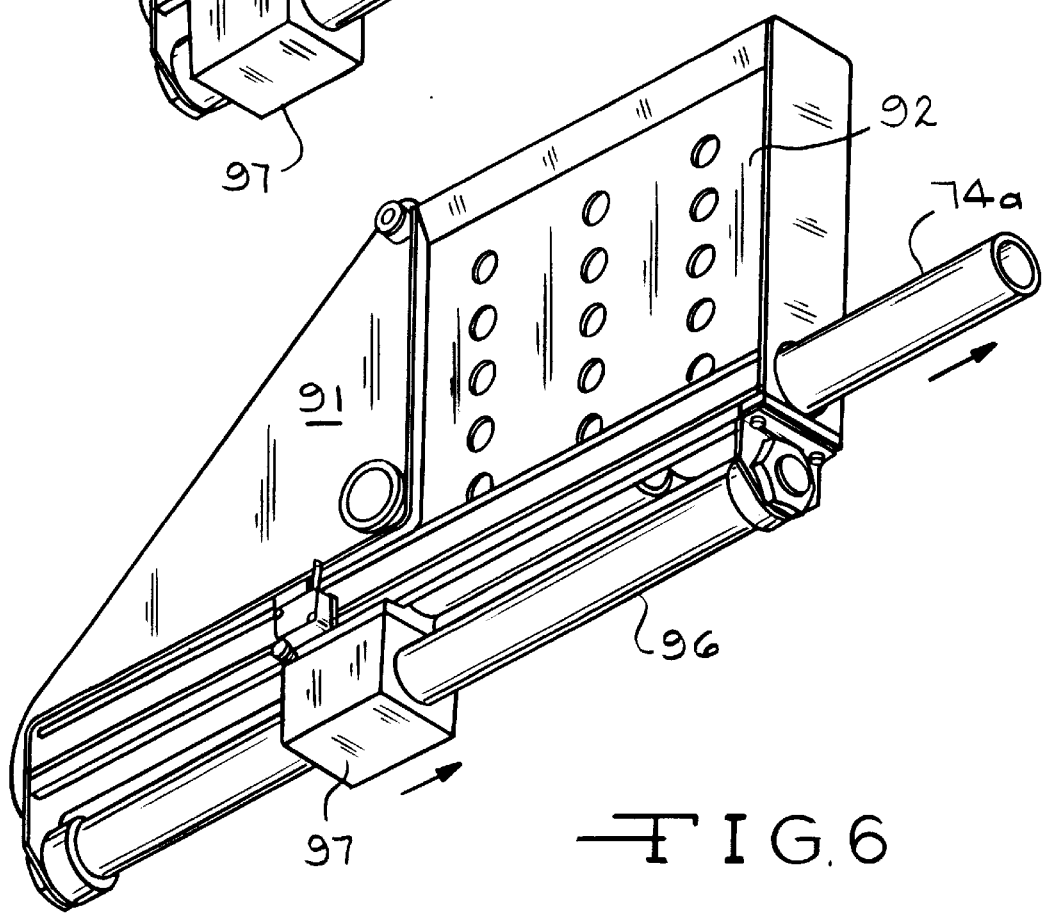

TUBE HANDLING APPARATUS

BACKGROUND OF THE INVENTION

The present invention is directed to a tube handling apparatus which loads and unloads tubes, such as hoses, on mandrels. In constructing hoses used, for example, in the automobile industry, single layer or multilayered tubes or hoses are often formed in a cylindrical shape. After formation, if bends are required in the final hose structure, the hose is placed on a mandrel having a shape corresponding to the desired final shape of the hose structure. It is then common practice to transfer a plurality of the hoses positioned on the mandrels to an oven, where the hoses are heated and cured. After removal from the oven, it is then necessary to remove the completed hoses from the mandrels. New uncured hoses are then positioned on the mandrels for the subsequent cycle.

The prior art has used lubricants on the mandrels to aid the manual positioning of uncured hoses onto the mandrels. However, as the shape of the finalized hose product becomes more complex often having several acute angle bends, even with the help of lubricants, it becomes a difficult, if not impossible manual operation to load the hoses onto the mandrels. It is even more difficult to remove the cured tubes or hoses from the mandrels after curing.

The prior art has suggested the use of, for example, a cylinder to push the uncured hoses upon a mandrel. This prior art apparatus often does not perform satisfactorily when the mandrel bends become more complex.

The object of the present invention is to provide an improved tube handling apparatus which positions and removes hoses on mandrels having complex configurations.

SUMMARY OF THE INVENTION

A tube handling apparatus according to the present invention includes a mandrel support having a plurality of mandrels of a predetermined shape to receive tubular workpieces. The apparatus includes first and second pluralities of driven rollers having outer surfaces for engaging the tubular workpieces and for urging them along the mandrels. Motors are provided for driving the rollers. A magazine is mounted adjacent the mandrels for receiving a plurality of uncured workpieces and directing them toward the mandrels.

In a preferred embodiment, a mandrel gripper is mounted on the mandrel support. The mandrel gripper engages a mandrel holder having a plurality of mandrels mounted thereon. The mandrel holder and the mandrels can be moved along desired paths to a position adjacent the driven rollers.

The rollers are used to both strip cured hoses from the mandrels after the workpieces have been oven cured and also to position new uncured workpieces, received from the magazine, upon the mandrels.

BRIEF DESCRIPTION OF THE DRAWINGS

FIG. 5 is a perspective view of a magazine unit showing a tube workpiece to be loaded at the bottom of the magazine unit;

FIG. 6 is a view similar to FIG. 5 showing the lowermost tube workpiece pushed outwardly.

DETAILED DESCRIPTION OF THE PREFERRED EMBODIMENTS

Figure 1:
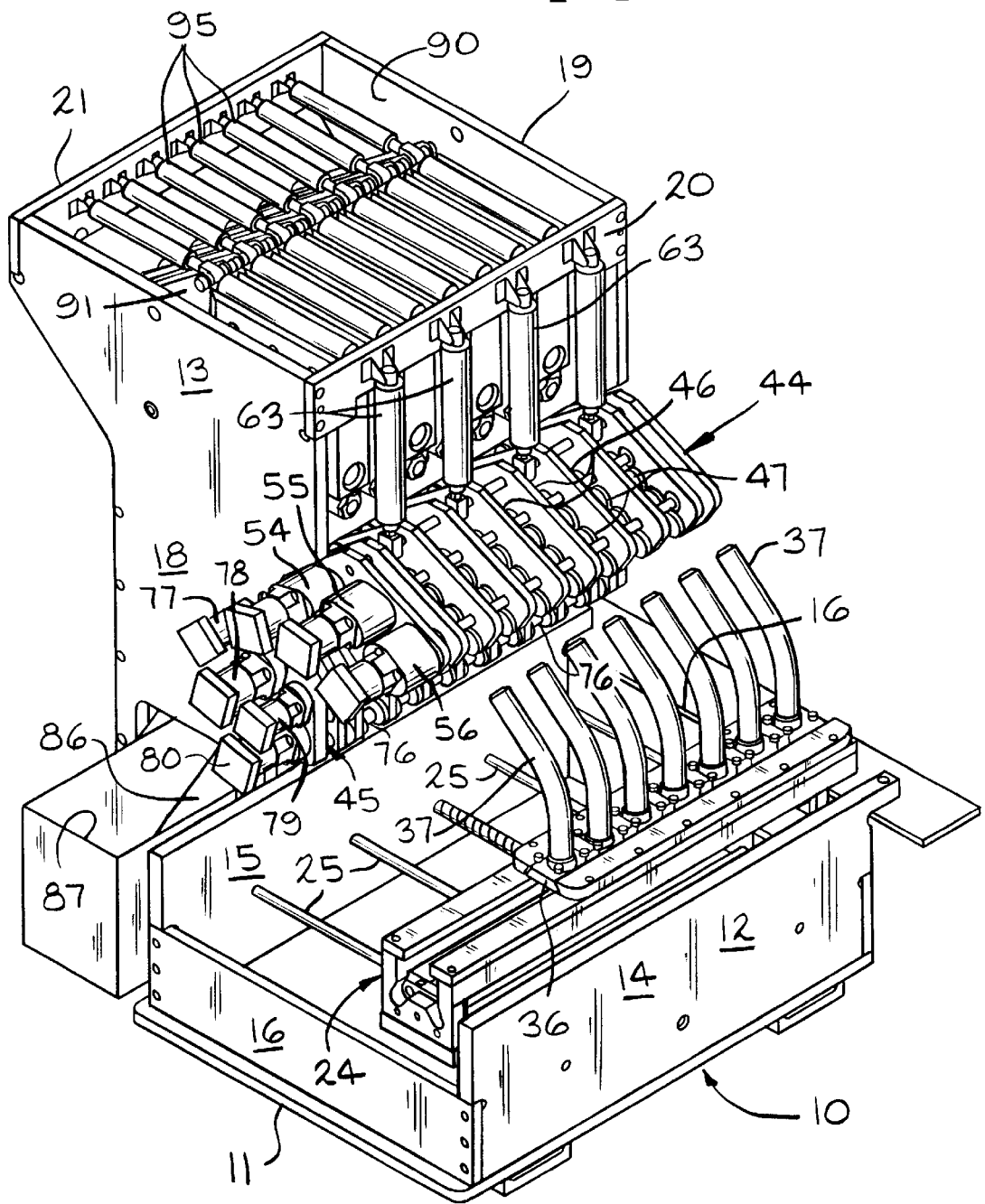
FIG. 1 is a perspective view of a tube handling apparatus, according to the present invention.

Referring to FIG. 1, a tube handling apparatus, according to the present invention is generally indicated by the reference number 10. The tube handling apparatus 10 includes a base 11 which mounts a front housing 12 and a rear housing 13. The front housing includes a front wall 14, a back wall 15 and side panels 16.

The rear housing 13 includes upstanding spaced side walls 18 and 19, a front panel 20, a spaced rear panel 21 and a rear wall 22.

Figure 2:
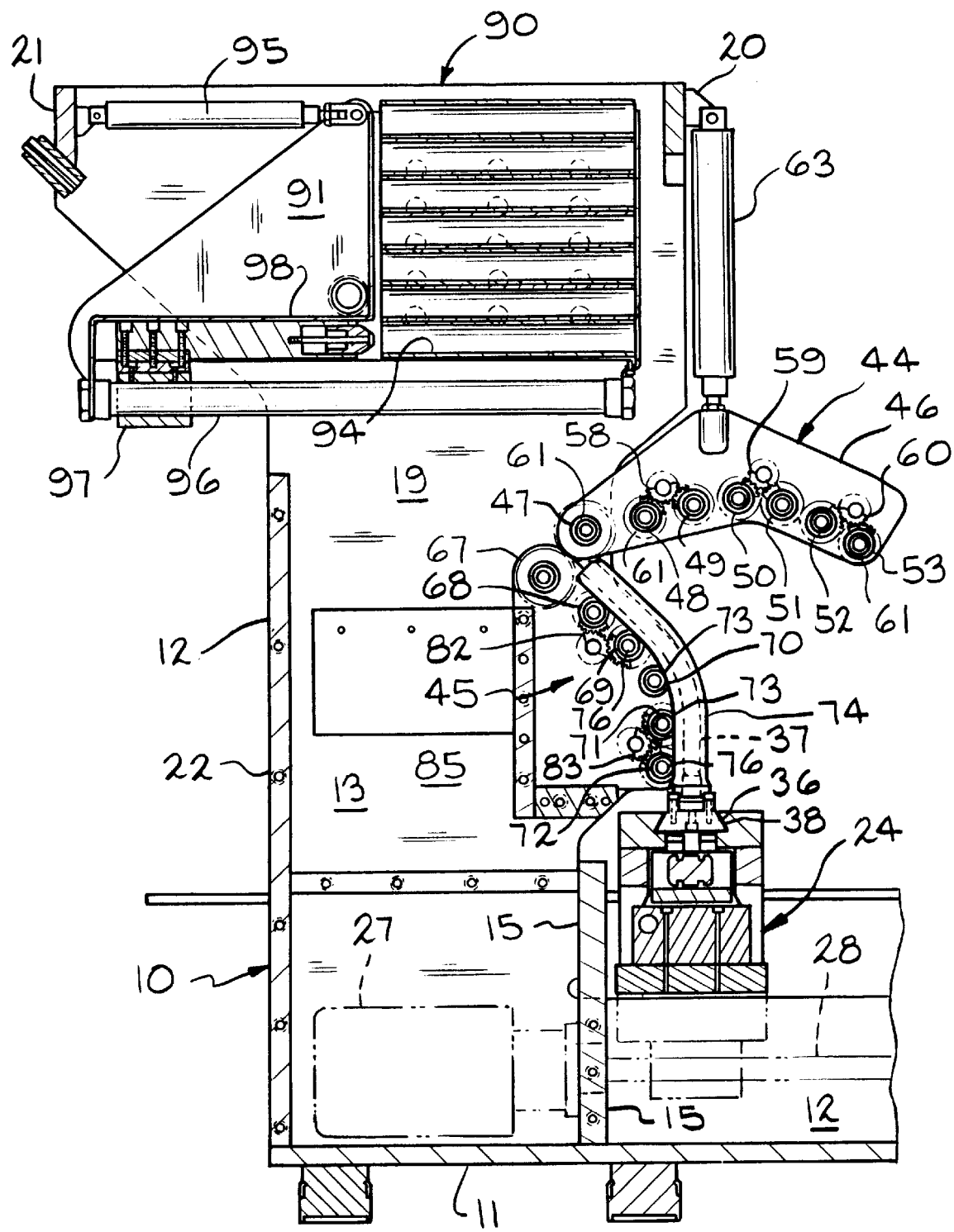
FIG. 2 is a cross-section of the tube handling apparatus as shown in FIG. 1 with the pluralities of rollers separated.
Figure 3:
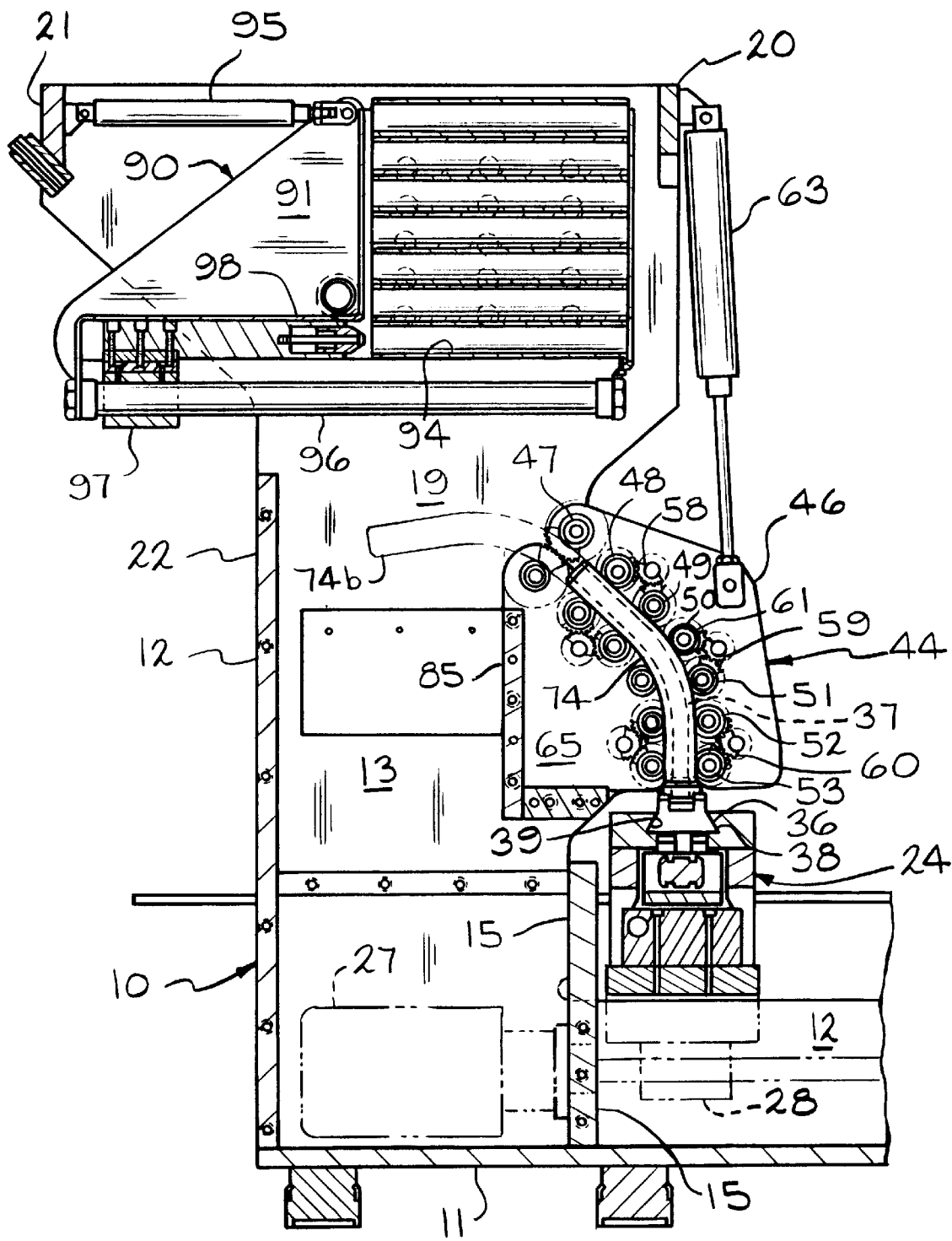
FIG. 3 is a view similar to FIG. 2 with the pluralities of rollers adjacent the mandrels.
Figure 4:
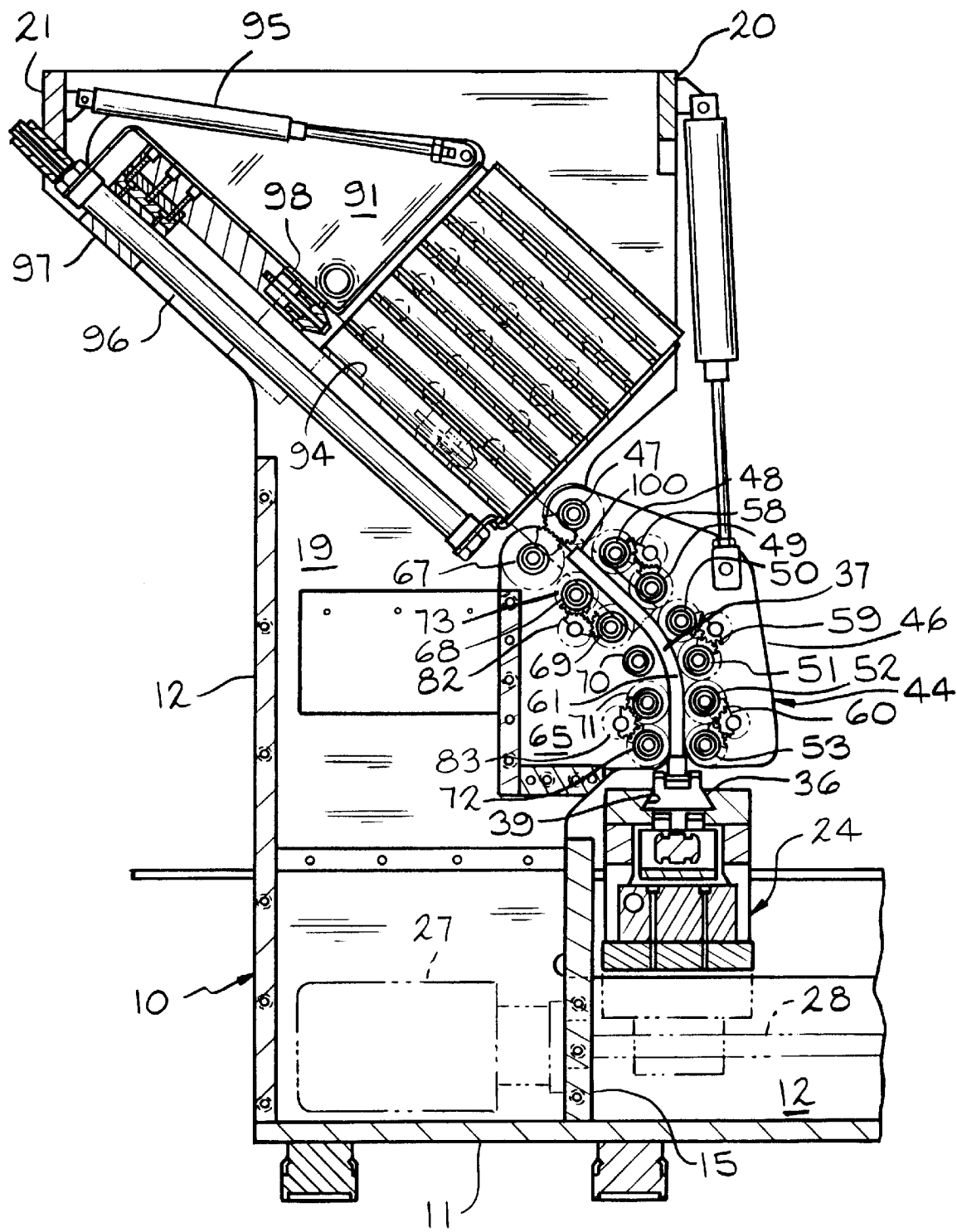
FIG. 4 is a cross-sectional view similar to FIG. 3 showing the magazine units moved into a position to supply tube workpieces to the mandrels.

Referring to FIG. 1, a mandrel support 24 is mounted for movement along a plurality of guide rods 25 extending between the front wall 14 and the back wall 15. A motor 27, as shown in FIG. 2, is mounted by the back wall 15 within the rear housing 13. The motor 27 drives a ball and screw assembly 28 which is connected to the mandrel support 24. The motor 27 and the ball and screw assembly 28 move the mandrel support 24 along the guide rods 25 between a first position adjacent the front wall 14, as shown in FIG. 1, and a second position adjacent the back wall 15 as shown in FIGS. 2–4.

Figure 7:
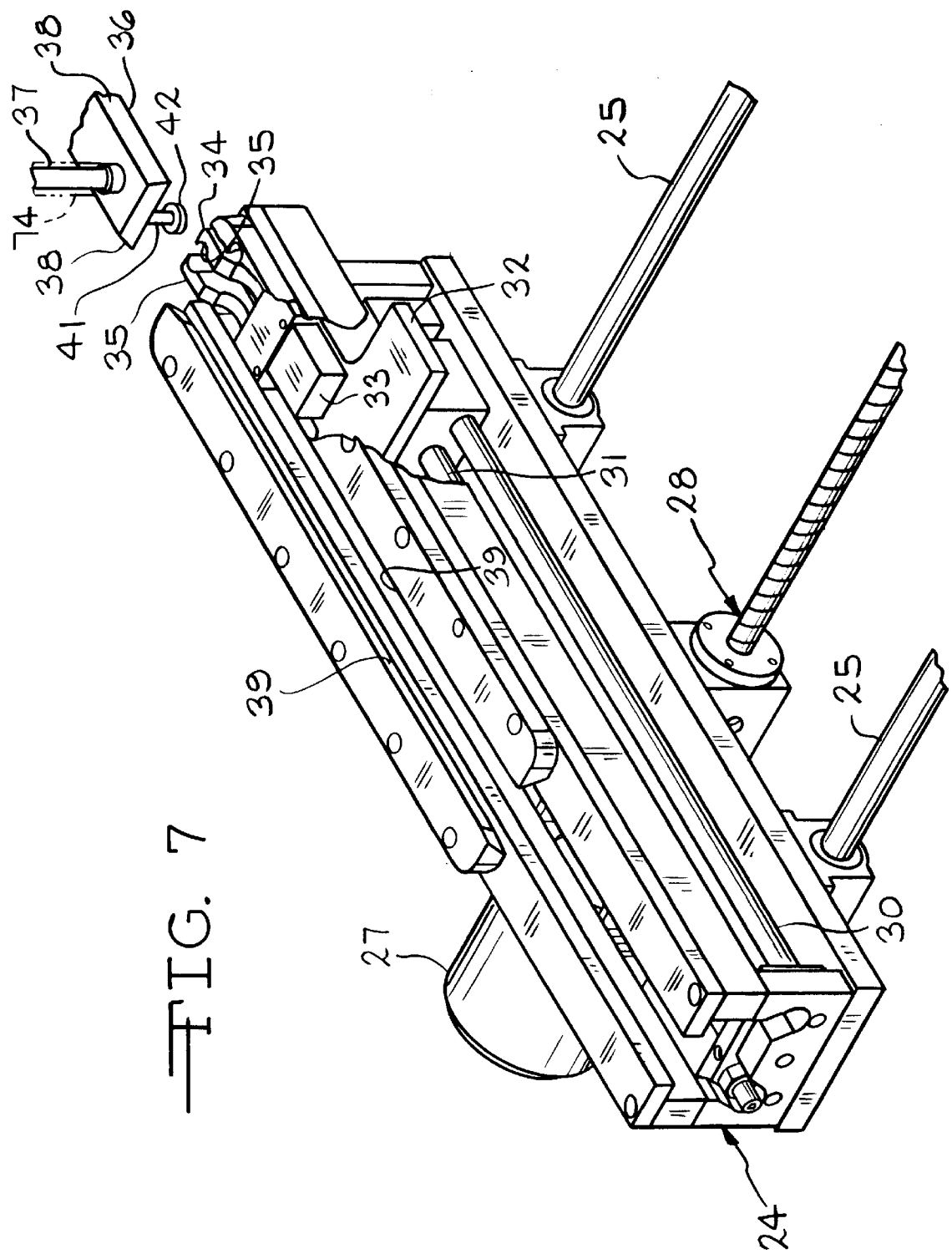
FIG. 7 is a fragmentary perspective view of the mandrel support.

Referring to FIG. 7, the mandrel support 24 includes a pair of support rods 30 which are perpendicular to the guide rods 25. A rodless cylinder 31 mounts a connector 32 for guided movement along the support rods 30. The connector 32 in turns mounts a gripping cylinder 33 and a gripper 34. The gripper cylinder 33 opens and closes the jaws 35 of the gripper 34. The mandrel support 24 also includes a longitudinally extending mandrel holder 36, which in turn mounts a plurality of mandrels 37. The mandrels 37 extend upwardly from the mandrel holder 36 and have predetermined shapes corresponding to the shape of the desired final shape of the tube workpieces. The mandrel holder 36 defines incline sides 38 which are received by ways 39 mounted on the top of the mandrel support 24. A depending projection 41 having an enlarged end 42 is mounted below each of the mandrel holders 36 (See FIG. 7).

In operation, a plurality of mandrel holders 36 having mandrels 37 mounted thereon are positioned on pallets which are normally moved by a conveyor. Cured workpieces, for example, are positioned on the mandrels 37. The mandrel holder 36 is moved to the first position, shown in FIG. 1, adjacent the front wall 14. At this time, the conveyor is stopped. A pallet has one of the mandrel holders 36 positioned as shown in FIG. 7. The mandrel support 24 has been moved by the motor 27 and the ball and screw assembly 28 to the FIG. 1 position. At this time, the rodless cylinder 31 is activated, moving the gripper 34 along the perpendicular path to a position where the depending projection 41 on the mandrel holder 36 is received within the jaws 35 of the gripper 34. The cylinder 33 closes the jaws 35. The rodless cylinder 31 is again activated to move the mandrel holder 36 and the mandrels 37 along the perpendicular path until it is in the FIG. 1 position. The motor 27 is activated and the ball and screw assembly 28 moves the mandrel support 24 inwardly against the back wall 15 to the position shown in FIGS. 2–4.

An upper roller assembly 44 is pivotably mounted between the side walls 18 and 19 and a lower roller assembly 45 is mounted between the side walls 18 and 19 in a stationary position. The upper roller assembly 44 includes a plurality of spaced plates 46. A series of shafts extend between the spaced plates 46 and mount a plurality of upper rollers 47–53. Upper rollers 47–53 are positioned on the shafts between each of the spaced plates 46 and have the same relative spacing as the mandrels 37 mounted by the mandrel support 24. In the present embodiment, upper roller 47 is an idler guide roller while each of the remaining upper rollers 48–53 is a driven positioning roller.

Referring to FIG. 1, the upper roller assembly 44 includes a plurality of servo motors 54, 55 and 56. The servo motor 54 is operatively connected to a gear 58 which drives the respective shafts and the rollers 48 and 49. The servo motor 55 is operatively connected to a gear 59 which operatively drives the rollers 50 and 51. The servo motor 56 is connected to a gear 60 which operatively drives the rollers 52 and 53. The driven guide roller 47 and the driven positioning rollers 48–53 each include outer surfaces 61 which engage the outer surfaces of workpieces positioned on the mandrels 37. The servo motors 54, 55 and 56 are reversible and drive the respective rollers 48–53 in both clockwise and counter-clockwise directions. A plurality of pneumatic cylinders 63 are connected between the front panel 20 of the rear housing 13 and the spaced plates 46 of the upper roller assembly 44 to move the upper roller assembly 44 between the raised position as shown in FIG. 2 and the lowered position shown in FIGS. 3 and 4.

Similarly, the stationary lower roller assembly 45 includes a plurality of fixed spaced plates 65. A plurality of lower rollers 67–72 having outer surfaces 73 engage workpieces 74 positioned on mandrels 37, as shown in FIG. 2. The lower rollers 67–72 are driven rollers and are mounted on shafts 76 which are operatively connected to a plurality of servo motors 77, 78, 79 and 80 (See FIG. 1). In the present embodiment, the servo motor 77 drives the roller 67; the servo motor 78 drives the rollers 68 and 69 through a gear 82; the servo motor 79 drives the roller 70; and the servo motor 80 drives the rollers 71 and 72 through a gear 83.

The driven rollers 48–53 and 67–72 are variable in speed, whereby the speed adjustments provide longitudinal compression or tension of the tubular workpieces 74 as desired by one of ordinary still during transport.

Referring to FIGS. 1 and 2, the rear housing 13 defines a discharge chamber 85 which communicates with a chute 86 having a discharge opening 87. When cured tubes or hoses are removed from the mandrels 37 by rotation of the mating upper and lower rollers 47–53 and 67–72, the cured hoses drop downwardly into the discharge chamber 85 and through the chute 86. After the cured hoses pass through the discharge opening 87, they are either removed in a batch operation or placed on a conveyor for movement to a next station.

The rear housing 13 of tube handling apparatus 10 also defines a magazine 90 which mounts a plurality of magazine units 91. Referring to FIGS. 5 and 6, each of the magazine units 91 includes a storage chamber 92 which receives a plurality of tubes or hoses, normally uncured. Referring to FIGS. 3 and 4, a plurality of pneumatic cylinders 95 are connected between the rear panel 21 of the rear housing 13 and the magazine units 91 to move the plurality of magazine units 91 between an upper storage and loading position shown in FIG. 3 and a lower discharge position shown in FIG. 4.

The uncured hoses are manually positioned within an upper end 93 of each storage chambers 92 and are moved downwardly by gravity until they reach a lowermost position 94, best shown in FIGS. 2–4. Referring to FIGS. 5 and 6, each of the magazine units 91 includes a rodless cylinder 96 having a yoke 97. The yoke 97 of the rodless cylinder 96 is operatively connected to a torpedo shaped plunger 98 which is movable along a path in alignment with the lowermost position 94 of the stack of hoses within each magazine unit 91. Referring to FIG. 4, when the magazine unit 91 is pivoted downwardly into the lowermost operating position, the rodless cylinder 96 moves the torpedo shaped plunger 98 along its predetermined path where it engages the lowermost hose and pushes the hose partially upon an upper end 100 of a respective one of the mandrels 37.

Referring to FIG. 6, a workpiece 74a is shown as it is moved outwardly from a magazine unit 91 by the movement of the rodless cylinder 96 and the torpedo shaped plunger 98.

It should be understood that many revisions may be made with respect to the number and sizes of the rollers provided with the upper roller assemblies 44 and the lower roller assemblies 45 together with the number of required servo motors and gears. Similarly, revisions may be made to the number and sizes of the individual magazine units 91 to compensation for hoses of different materials and different diameters and lengths.

The more complex the shape of the individual mandrels 37, normally the greater number of rollers are needed to urge the workpieces through the tight turns to become properly seated on the mandrels for transporting to the next work station.

In a normal cycle of operation of a tube handling apparatus 10, according to the present invention, after a mandrel holder 36 bearing cured workpieces has been moved within the front housing 12 to the FIG. 1 position, the motor 27 and the ball and screw assembly 28 move the mandrel support 24 to the position adjacent the back wall 15 as best shown in FIG. 2. At this time, the outer surfaces of the cured hoses or workpieces 74 are pressed against the rollers 67–72 of the lower roller assembly 45, while the upper roller assembly 44 remains in its upward position. At this time, the cylinders 63 are extended moving the upper roller assembly 44 to the down position, as shown in FIG. 3. In this position, the outer surfaces of the cured hoses or workpieces 74 are in contact with the rollers 47–53 of the upper roller assembly 44 and with the rollers 67–72 of the lower roller assembly 45. The servo motors 54–56 and 77–80 are activated and the driven rollers 48–53 and 67–72 urge the workpieces 74 outwardly from the mandrels 37 to the positions 74b, as shown in FIG. 3. From there, the cured workpieces 74 drop into the discharge chamber 85 and are moved through the chute 86 and the discharge opening 87 (See FIG. 1).

When the unloading cycle is completed, uncured tubes, hoses or workpieces 74 are manually inserted into the storage chambers 92 of the plurality of magazine units 91. During this time, the magazine units 91 are in their upper position, shown in FIGS. 2 and 3. After loading, the cylinders 95 are extended pivoting the plurality of magazine units 91 downwardly until the lowermost hose positions 94 are in alignment with the upper ends 100 of the respective mandrels 37, as best shown in FIG. 4. The plurality of rodless cylinders 96 are activated moving the respective torpedo shaped plungers 98 against the lowermost ones of the uncured workpieces 74 driving the workpieces onto the upper ends 100 of the respective mandrels 37. The servo motors 54–56 and 77–80 are reversed, to change the direction of rotation of the driven rollers 47–53 and 67–72. The force of the driven rollers 48–53 and 67–72 moves the uncured workpieces 74 along the length of the mandrels 37 over the bends of such mandrels.

After the workpieces 74 are fully seated on the mandrels 37, the cylinders 63 are retracted and the upper roller assembly 44 is pivoted upwardly, as shown in FIG. 2. The motor 27 is reversed and the ball and screw assembly 28 moves the mandrel support 24 along its path until it reaches a position adjacent the front wall 14 of the front housing 12. At this time, the rodless cylinder 31 is activated and the mandrel holder 36 is moved along a perpendicular or transverse path to position the uncured workpieces 74 and the mandrel holder 36 onto a pallet. After positioning, the jaws 35 of the gripper 34 are opened by the gripper cylinder 33 releasing engagement with the projection 41 which depends from the mandrel holder 36.

The mandrel holder 36 is indexed to supply a subsequent mandrel holder 36 bearing cured hoses or workpieces 34 and the above described cycle is repeated.

It is understood that many revisions may be made with respect to the specific cycle of operation or the individual components described above without departing from the scope of the present invention or from the following claims.

I claim:

1. A tube handling apparatus including a base, a mandrel support mounted adjacent said base, a motor operatively connected to said mandrel support for moving said mandrel support along a first path, a mandrel gripper mounted on said mandrel support for movement along a second path perpendicular to said first path, said mandrel gripper engaging a mandrel holder having a plurality of mandrels mounted thereon, whereby said mandrel holder and said mandrels can be moved by said mandrel gripper along said second path to a desired position, first and second pluralities of rollers having outer surfaces for engaging tubular workpieces mounted on said mandrels and at least one motor for driving at least some of said pluralities of rollers.

2. A tube handling apparatus, according to claim 1, wherein said mandrel support longitudinally extends along such second path and said mandrel gripper is operatively connected to a drive member for movement on said mandrel support along such second path.

3. A tube handling apparatus, according to claim 2, wherein said drive member is a cylinder.

4. A tube handling apparatus, according to claim 2, wherein said mandrel gripper includes a pair of gripper jaws and a jaw cylinder operatively connected to said gripper jaws for opening and closing said gripper jaws.

5. A tube handling apparatus, according to claim 1, further including a magazine for holding such workpieces and supplying such workpieces to said mandrels, said magazine including at least one drive plunger positioned for urging aligned workpieces partially onto said mandrels for reception between said first and second pluralities of rollers.

6. A tube handling apparatus, according to claim 1, including at least one cylinder operatively connected to said first plurality of rollers for moving said first plurality of rollers between a first position wherein said first plurality of rollers are spaced from said second plurality of rollers and a second position wherein said first plurality of rollers are adjacent said second plurality of rollers.

7. A tube handling apparatus, according to claim 5, wherein said magazine comprises a plurality of magazine units for holding a plurality of uncured tubular workpieces, each of said magazine units being pivotally mounted wherein a tubular workpiece located in each of said magazine units can be moved into alignment with mandrels positioned adjacent each of said magazine units, and magazine cylinders operatively connected to each of said magazine units to pivot said magazine units between a generally upper position and a lower aligned position with said mandrels.

8. A tube handling apparatus, according to claim 5, including a cylinder operatively connected to each of said at least one drive plunger for moving said at least one drive plunger toward the mandrels.

9. A tube handling apparatus, according to claim 1, wherein said at least one motor for driving said rollers comprises a plurality of servo motors.

10. A tube handling apparatus, according to claim 9, wherein at least one of said plurality of servo motors drives a gear which drives at least two of said first plurality of rollers.

11. A tube handling apparatus, according to claim 1, including a housing surrounding said base, said housing defining a chamber having an opening for discharging cured tubular workpieces which have been removed from said mandrels.

12. A tube handling apparatus including a base, a mandrel support mounted on said base, said mandrel support operatively mounting a plurality of mandrels, each of said mandrels having upper ends for receiving a tubular workpiece, first and second pluralities of driven rollers having outer surfaces for engaging the tubular workpieces and urging them along said mandrels, motors for driving said driven rollers, at least one magazine unit mounted adjacent said pluralitlies of rollers, said at least one magazine unit holding a supply of uncured tubular workpieces, said magazine unit being pivotable into alignment with said upper ends of said mandrels, and at least one drive plunger located in each of said at least one magazine units for urging aligned tubular workpieces partially onto said upper ends of said at least one mandrels for reception between said first and second pluralities of driven rollers, whereby rotation of said driven rollers moves said tubular workpieces along said at least one mandrel.

13. A tube handling apparatus, according to claim 10, wherein said servo motors drive said driven rollers at variable speeds, whereby the speed of the driven rollers is adjustable to provide desired longitudinal compression or tension of the tubular workpieces on said mandrels.

14. A tube handling apparatus including a base, a mandrel support mounted adjacent said base, a motor operatively connected to said mandrel support for moving said mandrel support along a first path, a mandrel gripper mounted on said mandrel support for movement along a second path perpendicular to said first path, said mandrel gripper engaging a mandrel holder having a plurality of mandrels mounted thereon, whereby said mandrel holder and said mandrels can be moved by said mandrel gripper along said second path to a desired position, first and second pluralities of rollers having outer surfaces for engaging tubular workpieces mounted on said mandrels, at least one motor for driving at least some of said pluralities of rollers, and at least one cylinder operatively connected to said first plurality of rollers for moving said first plurality of rollers between a first position wherein said first plurality of rollers are spaced from said second plurality of rollers and a second position wherein said first plurality of rollers are adjacent to said second plurality of rollers.

* * * * *

UNITED STATES PATENT AND TRADEMARK OFFICE
CERTIFICATE OF CORRECTION

PATENT NO. : 5,984,659
DATED : Nov. 16, 1999
INVENTOR(S) : Terry C. Potter

It is certified that error appears in the above-identified patent and that said Letters Patent is hereby corrected as shown below:

At column 3, line 17, please delete the first occurrence of "driven".

At column 3, line 42, please delete "still" and insert --skill--.

At column 4, line 64, please delete "47" and insert --48--.

Signed and Sealed this

Third Day of April, 2001

*Attest:*

NICHOLAS P. GODICI

*Attesting Officer*     *Acting Director of the United States Patent and Trademark Office*